US012775626B1

(12) United States Patent
Hasson

(10) Patent No.: US 12,775,626 B1
(45) Date of Patent: Oct. 27, 2026

(54) NODE-LEVEL UNCERTAINTY ESTIMATION FOR MACHINE LEARNING MODEL GENERATED STRUCTURED QUERIES

(71) Applicant: INTUIT INC., Mountain View, CA (US)

(72) Inventor: Hilaf Hasson, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 19/285,012

(22) Filed: Jul. 30, 2025

(51) Int. Cl.

| | |
|---|---|
| ***G06F 17/00*** | (2019.01) |
| ***G06F 7/00*** | (2006.01) |
| ***G06F 16/21*** | (2019.01) |
| ***G06F 16/22*** | (2019.01) |
| ***G06F 16/2455*** | (2019.01) |
| ***G06F 16/2457*** | (2019.01) |
| ***G06N 3/0475*** | (2023.01) |

(52) U.S. Cl.
CPC ...... *G06F 16/24575* (2019.01); *G06F 16/211* (2019.01); *G06F 16/2246* (2019.01); *G06F 16/24558* (2019.01); *G06F 16/24573* (2019.01); *G06N 3/0475* (2023.01)

(58) Field of Classification Search
CPC ......... G06F 16/24575; G06F 16/24558; G06F 16/24573; G06F 16/2246; G06F 16/211; G06N 3/0475
USPC ........................................................ 707/771
See application file for complete search history.

(56) References Cited

U.S. PATENT DOCUMENTS

| | | | | |
|---|---|---|---|---|
| 5,259,766 | A * | 11/1993 | Sack | G09B 7/04 434/323 |
| 2017/0039240 | A1 * | 2/2017 | Finlay | G06F 16/24542 |
| 2022/0101103 | A1 * | 3/2022 | Fatemi | G06N 3/045 |
| 2024/0330168 | A1 * | 10/2024 | Alomari | G06F 8/42 |
| 2024/0330571 | A1 * | 10/2024 | Reeve | G06F 16/84 |
| 2024/0394506 | A1 * | 11/2024 | Chiu | G06N 3/042 |
| 2025/0181594 | A1 * | 6/2025 | Shi | G06F 16/2246 |
| 2025/0307245 | A1 * | 10/2025 | Haynes | G06F 16/24542 |

* cited by examiner

*Primary Examiner* — Pavan Mamillapalli
(74) *Attorney, Agent, or Firm* — Patterson + Sheridan, LLP

(57) ABSTRACT

Aspects of the present disclosure relate to estimating uncertainty for machine learning model generated structured queries. Aspects include generating a structured query using a generative machine learning model based on an input request, obtaining a ground truth structured query corresponding to the input request, and parsing the generated structured query and the ground truth query into abstract syntax trees (ASTs). Aspects include aligning nodes between the ASTs to automatically generate labels for nodes in the AST for the generated structured query, generating features for each node in the generated ASTs, and training a machine learning model using the generated features and the generated labels to predict node-level error probabilities in generated structured queries.

20 Claims, 7 Drawing Sheets

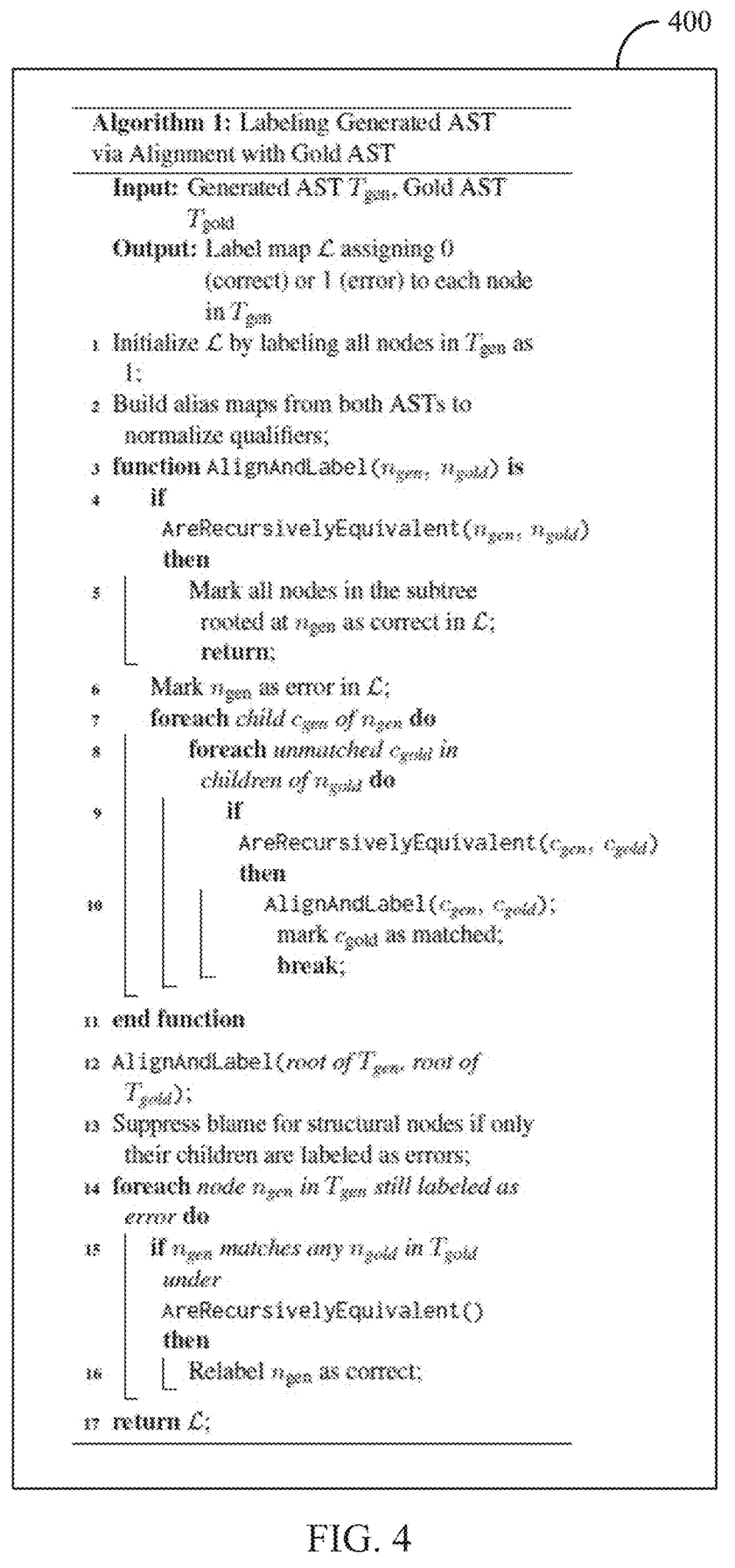

400

Algorithm 1: Labeling Generated AST via Alignment with Gold AST

Input: Generated AST $T_{gen}$, Gold AST $T_{gold}$

Output: Label map $\mathcal{L}$ assigning 0 (correct) or 1 (error) to each node in $T_{gen}$ Initialize $\mathcal{L}$ by labeling all nodes in $T_{gen}$ as 1;

Build alias maps from both ASTs to normalize qualifiers;

function `AlignAndLabel`($n_{gen}$, $n_{gold}$) is if `AreRecursivelyEquivalent`($n_{gen}$, $n_{gold}$) then

Mark all nodes in the subtree rooted at $n_{gen}$ as correct in $\mathcal{L}$;

return;

Mark $n_{gen}$ as error in $\mathcal{L}$;

foreach *child* $c_{gen}$ *of* $n_{gen}$ do foreach *unmatched* $c_{gold}$ *in children of* $n_{gold}$ do if `AreRecursivelyEquivalent`($c_{gen}$, $c_{gold}$) then

`AlignAndLabel`($c_{gen}$, $c_{gold}$);

mark $c_{gold}$ as matched;

break;

end function

`AlignAndLabel`(*root of* $T_{gen}$, *root of* $T_{gold}$);

Suppress blame for structural nodes if only their children are labeled as errors;

foreach *node* $n_{gen}$ *in* $T_{gen}$ *still labeled as error* do if $n_{gen}$ *matches any* $n_{gold}$ *in* $T_{gold}$ *under* `AreRecursivelyEquivalent()` then

Relabel $n_{gen}$ as correct;

return $\mathcal{L}$;

FIG. 4

NODE-LEVEL UNCERTAINTY ESTIMATION FOR MACHINE LEARNING MODEL GENERATED STRUCTURED QUERIES

INTRODUCTION

Aspects of the present disclosure relate to uncertainty estimation in machine learning-generated structured queries, and more particularly to a method and system for automated node-level uncertainty estimation based on abstract syntax trees of generated structured queries for use in automated validation and/or remediation of such queries.

BACKGROUND

Structured query languages have become a common tool for interacting with databases and retrieving information from complex data structures. As the volume and complexity of data continue to grow, there is an increasing need for efficient and accurate methods to generate and validate structured queries, such as to automatically retrieve data related to a request from a user of a software application. Machine learning models have shown promise in automating the generation of structured queries based on natural language inputs or other forms of user requests.

However, the automated generation of structured queries presents challenges in terms of accuracy and reliability. Errors in automatically generated queries can lead to incorrect results, inefficient database operations, or even system failures. Conventional approaches to query validation often rely on syntactic checks or execution-time error detection, which may not capture all potential issues, such as those related to semantic correctness or alignment with the intended user request, and may result in unnecessary errors.

Furthermore, the complexity of modern database schemas and the nuances of structured query languages make it difficult to develop comprehensive rule-based systems for error detection. Such rule-based systems may struggle to adapt to diverse database environments and evolving query patterns. There is a need for more flexible and robust methods to assess the quality and correctness of machine-generated structured queries in an automated manner.

As machine learning continues to play a larger role in database interactions and query generation, there is a growing need for advanced techniques to assess and communicate the reliability of generated queries. Such techniques could potentially improve the efficiency of query development processes, enhance the trustworthiness of automated systems, and ultimately lead to more robust and reliable database operations across various industries and applications.

BRIEF SUMMARY

According to an aspect of the present disclosure, a method for training a node-level uncertainty estimation machine learning model for structured queries is provided. The method includes generating a structured query using a generative machine learning model based on an input request. The method also includes obtaining a ground truth structured query corresponding to the input request. The method further includes parsing the generated structured query and the ground truth query into abstract syntax trees (ASTs). The method additionally includes aligning nodes between the ASTs for the generated structured query and the ground truth query to automatically generate labels for nodes in the AST for the generated structured query as correct or incorrect. The method also includes generating features for each node in the generated ASTs based on one or more structural properties of the node and based on one or more relational properties of the node relative to a target database schema. The method further includes training a machine learning model through a supervised learning process using the generated features and the generated labels to predict node-level error probabilities in generated structured queries.

According to another aspect of the present disclosure, a method for estimating uncertainty in machine learning model generated structured queries is provided. The method includes generating a structured query using a generative machine learning model. The method also includes parsing the generated structured query into an abstract syntax tree (AST). The method further includes generating node-level features for each node in the AST based on one or more structural properties of the node and based on one or more relational properties of the node relative to a target database schema. The method additionally includes generating a probability of error for each respective node of the AST based on the generated node-level features for the respective node using a machine learning model that has been trained through a supervised learning process based on corresponding node-level features of generated structured queries and ground truth structured queries for particular input requests. The method also includes performing one or more actions based on the generated probability of error for each respective node of the AST.

According to another aspect of the present disclosure, a system for estimating uncertainty in machine learning model generated structured queries is provided. The system includes one or more processors and a memory storing instructions that, when executed by the one or more processors, cause the system to perform operations. The operations include generating a structured query using a generative machine learning model based on an input request. The operations also include obtaining a ground truth structured query corresponding to the input request. The operations further include parsing the generated structured query and the ground truth query into abstract syntax trees (ASTs). The operations additionally include aligning nodes between the ASTs for the generated structured query and the ground truth query to automatically generate labels for nodes in the AST for the generated structured query as correct or incorrect. The operations also include generating features for each node in the generated ASTs based on one or more structural properties of the node and based on one or more relational properties of the node relative to a target database schema. The operations further include training a machine learning model through a supervised learning process using the generated features and the generated labels to predict node-level error probabilities in generated structured queries.

According to other aspects, a non-transitory computer readable medium may store instructions that, when executed by one or more processors of a computing system, cause the system to perform one or more of the methods set forth above. According to other aspects, a system includes one or more processors and a memory storing instructions that, when executed by the one or more processors, cause the system to perform one or more of the methods set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 4 illustrates a flowchart showing a pseudocode algorithm for labeling generated Abstract Syntax Tree nodes, according to aspects of the present disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
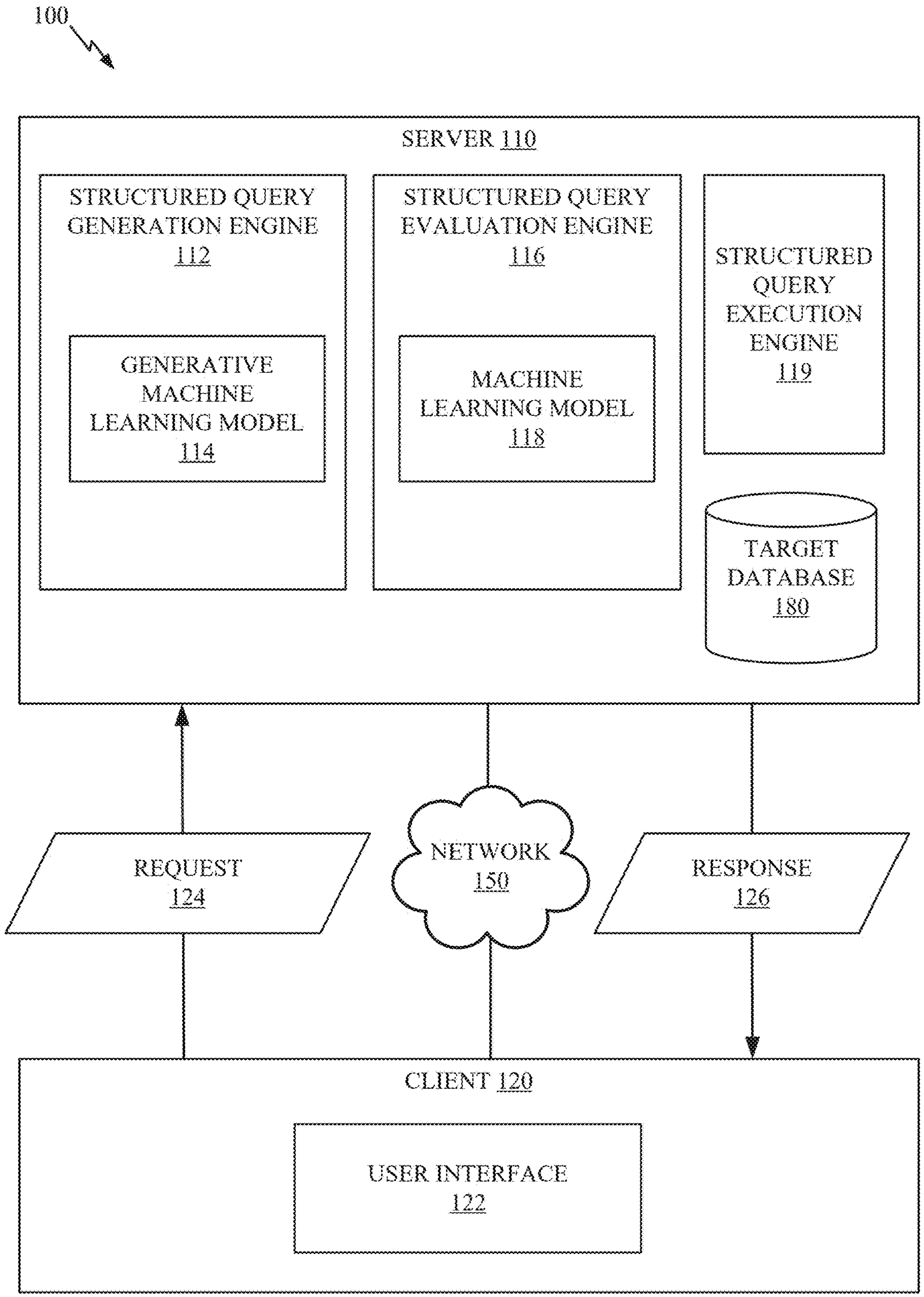
FIG. 1 illustrates a block diagram of a computing environment for processing structured queries, according to aspects of the present disclosure.

The present disclosure relates to a method and system for estimating uncertainty in machine learning model generated structured queries. Techniques described herein address the technical challenges associated with automatically generating and validating complex database queries by providing a novel node-level uncertainty estimation technique.

In various aspects, the disclosure may involve parsing a generated structured query into an abstract syntax tree (AST), generating features for each node in the AST based on structural and semantic properties, and using a trained machine learning model to predict the probability of error for each node. This node-level granularity allows for more precise identification of potential issues within a query, enabling targeted refinement and improvement.

The training process for the node-level uncertainty estimation machine learning model may involve several steps. Initially, a dataset of input requests and corresponding ground truth structured queries may be collected. For each input request, a generative machine learning model may produce a structured query. Both the generated query and the ground truth query may then be parsed into abstract syntax trees (ASTs).

The nodes between the ASTs for the generated and ground truth queries may be aligned using various techniques, which may allow for automatic labeling of nodes in the generated query's AST as correct or incorrect. This alignment process may involve recursive comparison of subtrees and consideration of semantic equivalence between nodes.

Features may be generated for each node in the ASTs based on structural properties of the node within the tree and relational properties of the node with respect to the target database schema. These features may capture important characteristics that could indicate potential errors or inconsistencies in the generated query.

The labeled nodes and their corresponding features may then be used as training data for a supervised machine learning model. This model may be trained to predict the probability of error for each node in a generated query's AST. The training process may involve iterative optimization of the model's parameters to minimize the difference between predicted error probabilities and the actual labels derived from the alignment process.

Once trained, the model may be applied to new, unseen structured queries to estimate node-level uncertainty. This approach may provide a fine-grained assessment of potential errors in generated queries, which may be used to improve query generation, guide refinement efforts, inform users about the reliability of different parts of a query, and/or the like.

Techniques described herein overcome technical challenges faced by prior techniques in a variety of ways. Firstly, aspects of the present disclosure address the limitations of conventional automated query validation methods that rely primarily on syntactic checks or execution-time error detection. These conventional approaches fail to capture semantic errors or misalignments with the intended user request, particularly in complex query structures. By incorporating machine learning-based uncertainty estimation at the node level, based on particular node-level features generated in a manner described herein, aspects of the present disclosure provide a more comprehensive and nuanced automated assessment of query correctness, taking into account both structural and contextual factors.

Secondly, aspects of the present disclosure overcome the technical challenge of adapting to diverse database environments and evolving query patterns. Rule-based systems for error detection in structured queries often struggle to keep pace with the complexity of modern database schemas and the variability in query structures. The particular machine learning based approach set forth in the present disclosure allows for greater flexibility and adaptability. By training on a diverse set of queries and their corresponding ground truth, the system may learn to recognize and flag potential errors across a wide range of query types and database schemas. This adaptability is particularly valuable in dynamic environments where database structures and query patterns frequently change.

Additionally, the alignment of nodes between generated and ground truth ASTs when generating training data enables fine-grained labeling at the node level, potentially capturing subtle errors that might be missed by traditional syntactic or execution-based validation methods. Furthermore, the generation of node-level features based on both structural and relational properties may provide a rich set of inputs for the machine learning model, allowing it to learn complex patterns and relationships within query structures. This approach may result in a more accurate and context-aware error prediction system, capable of identifying potential issues in generated queries even before execution, and thereby preventing errors more effectively than prior techniques. The iterative optimization process during training may also allow the model to continuously refine its understanding of error patterns, improving its performance over time as it encounters a wider range of query scenarios.

The techniques described herein may have various applications across different industries and use cases. In the field of database management, this approach may be used to enhance query optimization processes, improving database performance by identifying and addressing inefficient query structures before execution, such as resulting in generation of a corrected and/or improved query that can be executed with better results and/or without errors. In software development environments, the node-level uncertainty estimation may be integrated into integrated development environments (IDEs) or query builders, providing real-time feedback to developers as they construct or modify database queries. This may reduce errors and improve code quality. Additionally, in automated reporting systems or business intelligence platforms, techniques described herein may be employed to validate and refine automatically generated queries, ensuring the accuracy and reliability of data analytics processes. In cloud-based database services, techniques described herein may be utilized to offer advanced query validation as a service, helping clients optimize their database interactions and reduce resource consumption.

Experimental results demonstrate that techniques described herein outperform prior techniques for automated validation of generated structured queries, producing more accurate error probabilities. For example, experiments showed an approximately eighteen to twenty-seven percent improvement in area under the curve (AUC) for the receiver operating characteristic (ROC) curve across a variety node types (e.g., identifier, column, literal, table, table alias, and/or the like) as compared to certain prior techniques. Furthermore, while some existing techniques involve the use of a black-box language model where the question, schema, and generated query are all fed in as a single text, aspects of the present disclosure involve featurizing the individual nodes explicitly and thereby allowing for a more explainable model, and allowing for selection of more highly informative features. Additionally, while some existing techniques define ground truth using a relational algebra tree and thereby allowing for errors to propagate, aspects of the present disclosure produce more accurate and granular node-level ground truth labels where errors are not unnecessarily propagated through the tree structure. Thus, techniques described herein provide more accurate and actionable predictions at the node level using a model trained on such a training data set, as compared to existing techniques where uncertainty estimation is more general and less accurate. Such improved targeted uncertainty estimation at the node level enables improved automated remediation of a generated structured query, such as enabling the generation of a new structured query using a generative machine learning model that is informed of such node-level uncertainty estimations in a previously-generated structured query and is thereby able to correct potential errors in a targeted manner.

Example Computing Components Related to Node-Level Uncertainty Estimation for Machine Learning Model Generated Structured Queries FIG. 1 illustrates a block diagram of a computing environment 100 related to node level uncertainty estimation for machine learning model generated structured queries. The computing environment 100 may include a server 110 and a client 120 connected via a network 150.

Server 110 may comprise one or more processors and a memory storing instructions. In some cases, server 110 may be an application server or other computing device that hosts a computing application accessed by one or more users, such as via user interface 122 on client 120.

The client 120 be a computing device by which a user interacts with a computing application, and may include a user interface 122 that enables such interaction. The client 120 may send a request 124 through the network 150 to the server 110, and may receive a response 126 back through the network 150. For example, request 124 may be a request for information, and may be based on input received from the user via user interface 122, such as requesting the information, requesting functionality that relates to the information, and/or the like. In one example, request 124 is a natural language description of information that is requested. Server 110 may generate response 126 through a process that involves automated generation and validation of a structured query in a structured query format such as structured query language (SQL) based on request 124 and execution of a validated structured query against a target database 180 (e.g., storing the requested information). Client 120 may perform one or more actions based on response 126, such as displaying response 126 via user interface 122, providing other output via user interface 122 based on response 126, storing data in memory based on response 126, populating a variable in a data structure based on response 126, providing information to another component based on response 126, making an automated determination based on response 126, and/or the like.

Server 110 may contain multiple components for generating, validating, and executing structured queries. A structured query generation engine 112 may include a generative machine learning model 114. In some cases, generative machine learning model 114 may be a large language model (LLM) or other type of language processing machine learning model, a sequence-to-sequence model such as a transformer-based architecture, a fine-tuned version of a pretrained language model that is specifically adapted for structured query generation tasks, a diffusion model, a generative adversarial network (GAN), a neural network machine translation model trained on pairs of natural language requests and corresponding structured queries, an ensemble of multiple machine learning models, potentially combining different architectures to leverage their respective strengths in query generation tasks, and/or the like. In one particular example, generative machine learning model 114 is a large language model, such as an OmniSQL-7B model, specifically trained on a diverse dataset of SQL queries and natural language descriptions, enabling it to generate complex structured queries across various database schemas and query patterns. In some cases, generative machine learning model 114 may incorporate reinforcement learning techniques to improve its query generation capabilities based on feedback from query execution results.

Server 110 further includes a structured query evaluation engine 116, which contains a machine learning model 118, and a structured query execution engine 119 connected to a target database 180. The functionality of structured query generation engine 112, structured query evaluation engine 116, and structured query execution engine 119 is described in more detail below with respect to FIG. 2, and the training of machine learning model 118 is described in more detail below with respect to FIG. 3.

The components may interact in a specific flow: For example, structured query generation engine 112 may process incoming requests using the generative machine learning model 114, such as generating a structured query based on request 124. Structured query evaluation engine 116 may evaluate generated structured queries using machine learning model 118, such as to determine node-level uncertainty probabilities for the structured query that was automatically generated based on request 124. Structured query execution engine 119 may execute structured queries against the target database 180, such as executing an automatically generated structured query that has been validated through techniques described herein. The target database 180 may, for example, comprise a relational database management system (RDBMS) that stores structured data in tables, which can be queried and manipulated using structured query languages such as SQL. This is included as an example, and any suitable queriable data storage and retrieval component may be used for target database 180.

The network 150 may facilitate communication between the server 110 and client 120, enabling the transmission of requests 124 and responses 126.

Figure 2:
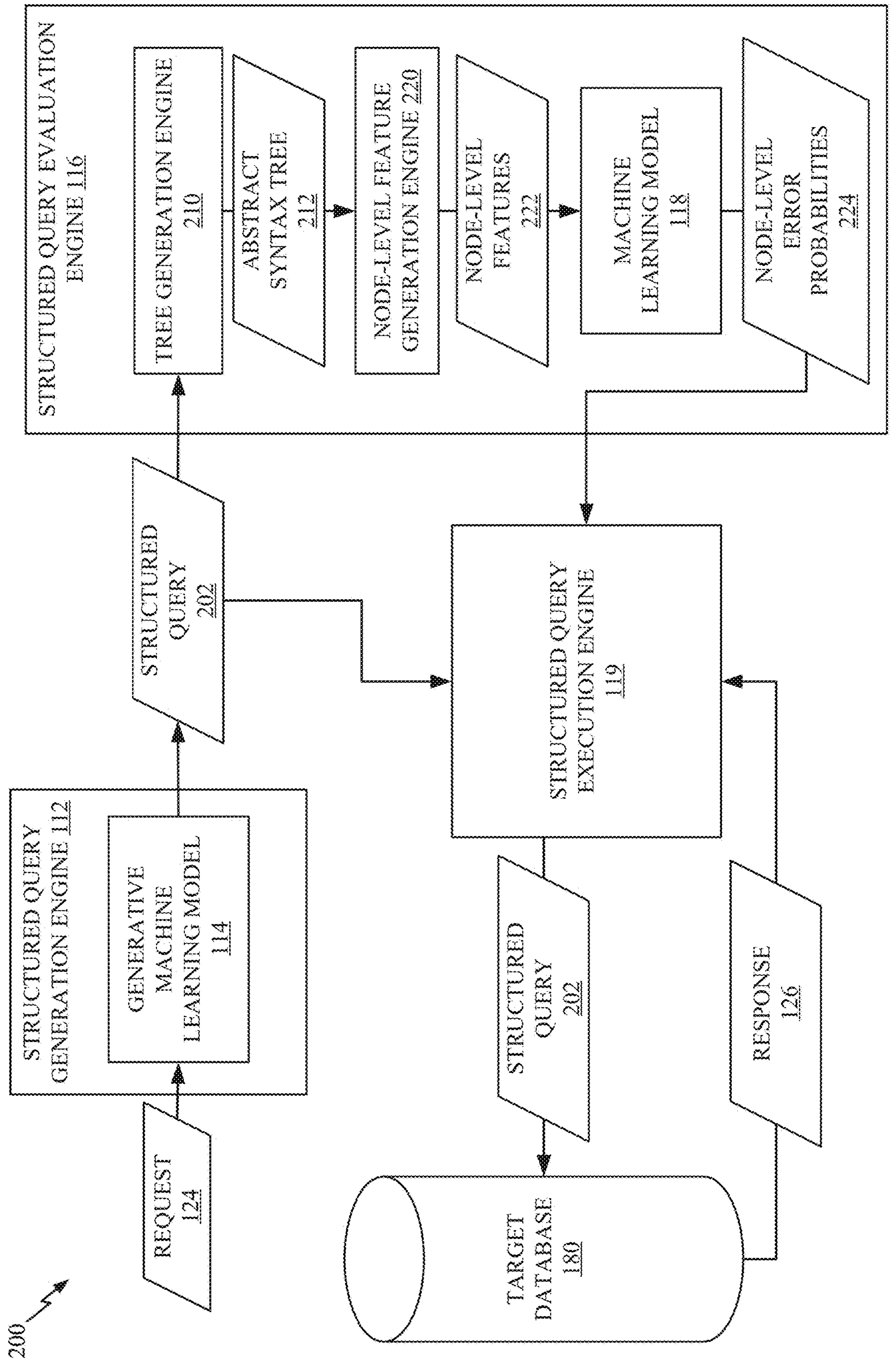
FIG. 2 illustrates a block diagram for processing structured queries, according to aspects of the present disclosure.

Example of Node-Level Uncertainty Estimation for Machine Learning Model Generated Structured Queries FIG. 2 is an illustration 200 related to automated generation, validation, and execution of structured queries based on node-level uncertainty estimation, according to aspects of the present disclosure. Illustration 200 includes structured query generation engine 112, generative machine learning model 114, structured query evaluation engine 116, machine learning model 118, structured query execution engine 119, target database 180, request 124, and response 126 of FIG. 1.

Structured query generation engine 112 receives request 124 and generates a structured query 202 based on request 124 using generative machine learning model 114. For example, structured query generation engine 112 may provide request 124 as input to generative machine learning model 114, and generative machine learning model 114 may output structured query 202 in response to the input. For instance, generative machine learning model 114 may process request 124 by analyzing its semantic content, intent, and/or the like. In some cases, generative machine learning model 114 may leverage natural language understanding techniques to extract key information from the request, such as desired data fields, filtering conditions, or aggregation requirements. The model may then map this extracted information to the appropriate structured query language constructs, taking into account the schema and structure of the target database 180. The schema of target database 180 may also be provided as input to generative machine learning model 114 (e.g., as context) along with request 124, and/or generative machine learning model 116 may have been trained to generate structured queries specifically for the schema of target database 180. During this process, generative machine learning model 114 may utilize its training on diverse query patterns to generate a structured query 202 that accurately reflects the intent of the original request 124. The generated structured query 202 may include various SQL components such as SELECT statements, JOIN operations, WHERE clauses, and aggregate functions, depending on the complexity and requirements of the request 124.

The structured query 202 may be provided to structured query evaluation engine 116 for automated evaluation (e.g., for validation). Within structured query evaluation engine 116, a tree generation engine 210 may process the structured query 202 to produce an abstract syntax tree 212. Tree generation engine 210 may parse structured query 202 into a hierarchical representation of its syntactic structure. Tree generation engine 210 may employ various parsing techniques to construct abstract syntax tree 212. In some cases, it may utilize a recursive descent parser that traverses the structured query 202 from top to bottom, identifying and categorizing different components of the query. The engine may recognize specific SQL keywords, clauses, and expressions, creating corresponding nodes in the abstract syntax tree 212 to represent these elements. As it processes the query, the tree generation engine 210 may also establish relationships between different parts of the query, such as nesting conditions or join operations, which are reflected in the hierarchical structure of the abstract syntax tree 212. This process may result in a comprehensive representation of the query's structure, where each node in the tree corresponds to a specific element or operation within the original structured query 202. It is noted that various techniques for generating ASTs exist, and any suitable technique may be used.

A node-level feature generation engine 220 within structured query evaluation engine 116 may process abstract syntax tree 212 in order to generate node-level features 222. The node-level feature generation engine 220 may extract various characteristics from each node in abstract syntax tree 212, such as structural properties, relational properties relative to a target database schema (e.g., the schema of target database 180), lexical features, and/or the like. For example, node-level feature generation engine 220 may analyze each node's position within abstract syntax tree 212, capturing information such as the node's depth, its relationship to parent and child nodes, its role within specific query clauses, and/or the like. In some cases, the engine may generate features that reflect the complexity of subtrees rooted at each node, which may provide insights into the intricacy of different query components. Node-level feature generation engine 220 may also consider the semantic meaning of each node in relation to the target database schema, potentially generating features that indicate whether column names, table references, or join conditions align with the existing database structure. Additionally, node-level feature generation engine 220 may extract lexical characteristics from identifier names or literal values associated with each node, which may help capture patterns or potential inconsistencies in naming conventions or data formats used within the query.

Thus, node-level features 222 of a given node may indicate, for example, node type (e.g., SELECT, FROM, WHERE, JOIN, etc.), depth of the node in the abstract syntax tree, number of child nodes, number of sibling nodes, position among siblings (e.g., first, last, middle), parent node type, grandparent node type, distance from the root node, distance from the nearest leaf node, subtree size (number of nodes in the subtree rooted at this node), subtree depth (maximum depth of the subtree rooted at this node), node complexity score (based on a combination of subtree size and depth), presence of specific keywords or operators within the node, data type of the node (if applicable, e.g., string, integer, date), validity (e.g., relative to the target database schema, such as based on semantic comparison) of table names, column names, or other identifiers referenced in the node, consistency of data types in comparisons or operations, presence of wildcards or LIKE operators, use of aggregate functions (e.g., COUNT, SUM, AVG), semantic meaning of a node's content (e.g., an embedding), presence of subqueries, nesting level of subqueries, use of particular keywords or clauses, number of tables involved in a JOIN operation, type of JOIN operations used (e.g., INNER, LEFT, RIGHT, FULL), presence of complex expressions or calculations, use of window functions, presence of particular operations or clauses, use of temporary tables or Common Table Expressions (CTEs), presence of correlated subqueries, complexity of particular clause conditions, use of built-in functions (e.g., string manipulation, date functions), presence of parameter placeholders or variables, use of table aliases, presence of self-joins, use of derived tables or inline views, and/or the like. Such features may be used individually or in combination to provide a comprehensive representation of each node's characteristics and context within the abstract syntax tree, enabling the machine learning model to make accurate predictions about potential errors or uncertainties in the generated structured query.

Generally, the purpose of generating node-level features may be to provide a rich, evidence-based description of each node, capturing its structure, semantic validity, and context. Features may be grouped into several logical categories. Base structural features may, for example, be a foundational category that describes the node's identity and position within the AST, such as including the node's syntactic type (e.g., Column, Join), its depth relative to the root, and the type of its immediate parent. Schema consistency features may be a feature category for detecting content errors, such as indicating a node's content against the target database schema, using a scope resolution module that correctly interprets table aliases and nested queries. Examples of schema consistency features include identifier validity (e.g., a binary feature checking if a table or column name exists in the schema), qualifier scope validity (e.g., for a qualified column like T.name, this checks if the qualifier T is a valid table or alias within the current scope of the query), column ambiguity (e.g., a feature that detects if an unqualified column name could refer to columns in multiple tables that are currently in scope, a common source of error in queries with multiple joins), and/or the like.

Lexical and typo-detection features may be a feature category that helps the model identify errors in identifiers that are syntactically well-formed but semantically incorrect (i.e., typos). Lexical and typo-detection features may be primarily for identifier and column nodes. Examples of lexical and typo-detection features include Levenshtein distance (e.g., if an identifier is not found in the schema, its Levenshtein (edit) distance to the closest valid identifier (table or column) in the entire schema may be computed, and a small distance, such as less than a threshold, may be a strong indicator of a typo), name patterns (e.g., a series of binary features capturing lexical patterns in an identifier's name, such as whether it contains numbers, underscores, or is written in 'ALL CAPS' or 'mixedCase'), and/or the like. Contextual and heuristic features may be a broad feature category that captures common SQL error patterns that depend on a node's relationship with other nodes, helping the model to infer structural and type-based errors. Examples of contextual and heuristic features include aggregate context (e.g., a feature specifically designed to detect one of the most common SQL errors such as the presence of a non-aggregated column in a SELECT list that also contains an aggregate function (e.g., SUM( )) but lacks a corresponding GROUP BY clause), data type compatibility (e.g., for binary operations (=, >, etc.), the data types of the left and right operands may be resolved and a feature representing their compatibility, such as NUMERIC vs. STRING, may be included), operator-specific features (e.g., for certain node types, highly specialized features may be added, such as extracting from a Like node features about its pattern such as presence of wildcards or pattern length, for an In node capturing the number of elements in its list, and/or the like), and/or the like.

One aspect of techniques described herein may involve ensuring that every node, regardless of its type, produces a feature vector of the same length. Features that are not applicable to a given node may be assigned a neutral default value. For example, the Levenshtein distance feature may only be computed for identifier nodes, and for all other node types (e.g., Select, Join), the Levenshtein distance feature may default to a high constant value representing "no close match." Likewise, boolean features may default to 0 when not applicable to a given node. This ensures that the model receives a consistently shaped input for any node in any given query.

The node-level features 222 may be provided as inputs to machine learning model 118, which may output node-level error probabilities 224 in response to the inputs. Machine learning model 118 may analyze node-level features 222 of each node to estimate the likelihood of errors for the node. For example, machine learning model 118 may be a tree-based model such as gradient boosting decision tree model, such as XGBoost or LightGBM, which can effectively handle complex feature interactions and provide interpretable feature importance scores. In some cases, machine learning model 118 may be a neural network, such as a multi-layer perceptron or a graph neural network, which can capture intricate patterns in the node-level features. In other aspects, machine learning model 118 may be a transformer model, a language processing machine learning model such as an LLM, a random forest model, a regression model, a support vector machine, a Bayesian belief network, a diffusion model, a convolutional neural network (CNN), a recurrent neural network (RNN), a generative adversarial network (GAN), a deep belief network (DBN), a Boltzmann machine, a Markov decision process (MDP), a reinforcement learning model, and/or the like. Alternatively, machine learning model 118 may be an ensemble model that combines predictions from multiple base models, such as random forests, support vector machines, and neural networks, to leverage the strengths of different approaches. The choice of model architecture may depend on factors such as the size and complexity of the training dataset, the computational resources available, and the specific requirements for interpretability and performance in the query evaluation task.

Machine learning model 118 may have been trained, such as through a supervised learning process, based on a training data set that includes node-level of features for nodes of an AST of a structured query associated with node-level labels for the nodes. Generation and use of such training data to train machine learning model 118 is described in more detail below with respect to FIG. 3.

Node-level error probabilities 224 output by machine learning model 118 may indicate a likelihood of error for each node in abstract syntax tree 212. In some aspects, node-level error probabilities 224 may be used (e.g., by structured query execution engine 119) to determine whether to execute structured query 202, to determine whether structured query 202 should be modified or regenerated, to provide output to a user, and/or the like. In one example, if node-level error probabilities 224 indicate a probability of error above a threshold value for a given node, structured query execution engine 119 may determine not to execute structured query 202, and may provide instructions to another component (e.g., structured query generation engine 112) to modify or generate a new structured query based on node-level error probabilities 224. For example, based on such a determination, node-level error probabilities 224 (or at least a subset of node-level error probabilities 224, such as the values for one or more nodes that exceed the threshold) and structured query 202 may be provided as inputs to generative machine learning model 114 along with request 124 so that generative machine learning model 114 can generate a new structured query that is informed by the determined likelihoods of error in the previously-generated structured query 202. Thus, the newly generated structured query may be free of one or more errors that are present in structured query 202. The newly generated structured query may then be validated by structured query evaluation engine 116 in a similar manner to that described above with respect to structured query 202, and may be executed (or modified, regenerated, or the like) based on whether one or more node-level error probabilities for the newly generated structured query exceed a threshold.

In some implementations, the system may take various other actions based on node-level error probabilities 224. For instance, the system may generate a visual representation of the abstract syntax tree 212, highlighting nodes with error probabilities exceeding certain thresholds using different colors or patterns. This visualization may be presented to a user or developer for manual review and correction. Additionally, the system may automatically generate suggestions for query modifications based on the identified high-probability error nodes, such as proposing alternative table joins, column selections, or filtering conditions. In cases where multiple nodes exhibit high error probabilities, the system may prioritize addressing the errors based on their potential impact on query results or performance. The system may also use the node-level error probabilities to inform a query optimization process, focusing on restructuring parts of the query with lower confidence scores. Furthermore, the error probabilities may be used to generate detailed error reports or logs, providing insights into common error patterns across multiple queries, which can be valuable for improving the generative machine learning model 114 or refining database schemas.

Structured query execution engine 119 may process structured query 202 (e.g., if it successfully validated, such as not having any node-level error probabilities above a threshold) by executing the structured query 202 against target database 180, which may produce a response 126 based on structured query 202. For example, structured query execution engine 119 may execute structured query 202 against target database 180 using database management system (DBMS) protocols. The execution process may involve parsing the query, optimizing an execution plan, retrieving the requested data from the relevant tables and indexes within target database 180, and/or the like. In some cases, the execution engine may utilize query optimization techniques such as index selection, join order optimization, or parallel processing to enhance performance. The retrieved data may then be processed according to any specified operations in structured query 202, such as filtering, sorting, or aggregation. Finally, the processed data may be formatted into response 126, which may include the requested information, summary statistics, or other query results as specified in the original request 124. In some cases, target database 180 returns retrieved data (e.g., rather than directly returning response 126), and response 126 is generated (e.g., by structured query execution engine 119) based on the retrieved data. In some aspects, response 126 only includes retrieved data, which may then be processed and/or formatted to determine a response to provide to the request, such as in a natural language format or otherwise.

Figure 3:
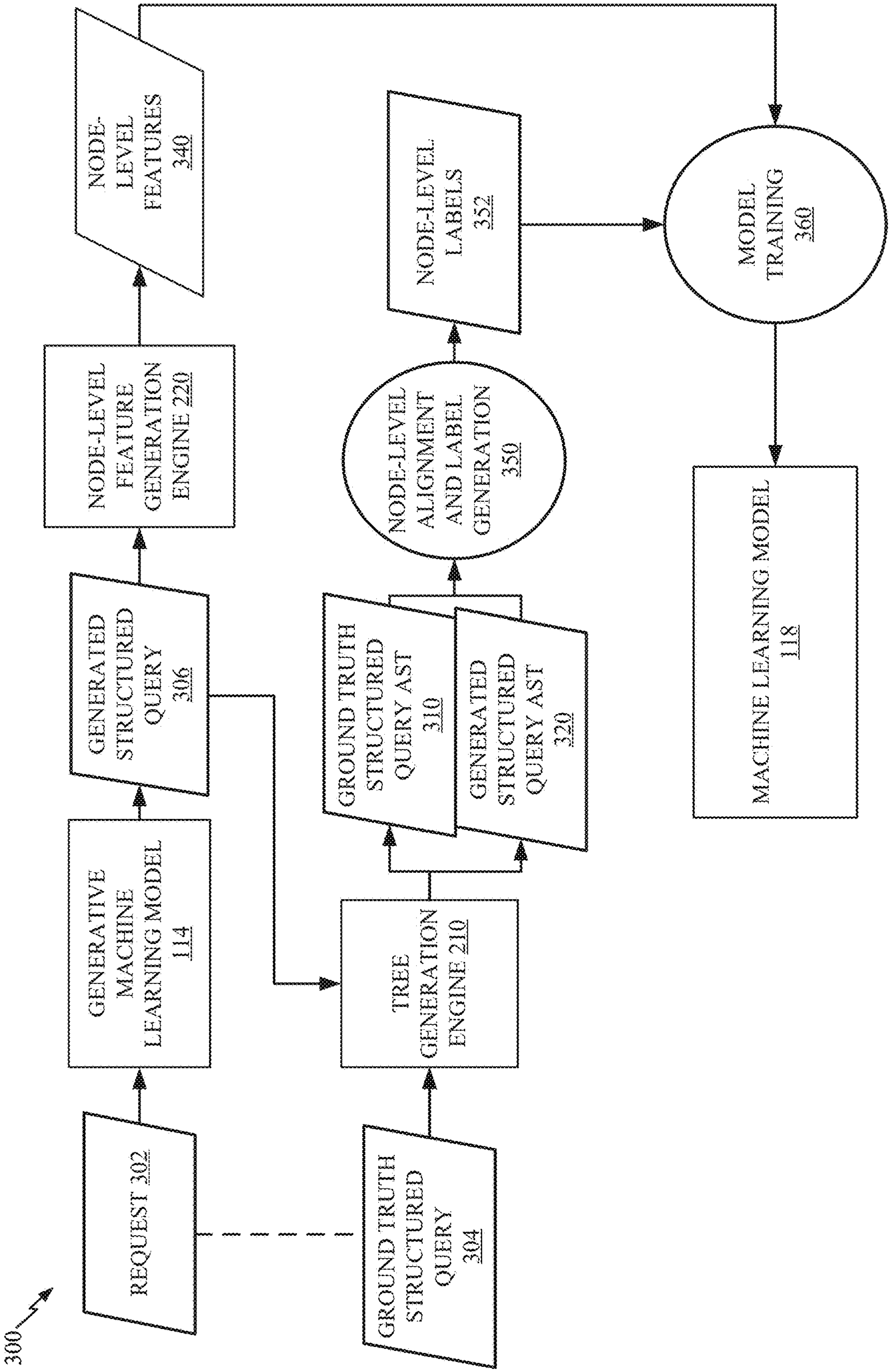
FIG. 3 illustrates a block diagram for processing structured queries and training a machine learning model, according to aspects of the present disclosure.

Example Model Training Process Related to Node-Level Uncertainty Estimation for Machine Learning Model Generated Structured Queries FIG. 3 is an illustration 300 related to training a machine learning model for node-level uncertainty estimation in structured queries. Illustration 300 includes generative machine learning model 114, and machine learning model 118 of FIGS. 1 and 2, and node-level feature generation engine 220 and tree generation engine 210 of FIG. 2. Illustration 300 generally relates to an automated process for generating training data and training machine learning model 118 using the training data.

A request 302 may be associated with a ground truth structured query 304. Similarly to request 124 of FIGS. 1 and 2, request 302 may be a request for information, and may be based on input received from the user via user interface 122 of FIG. 1, such as requesting the information, requesting functionality that relates to the information, and/or the like. In one example, request 302 is a natural language description of information that is requested. Ground truth structured query 304 generally represents a structured query that is verified (e.g., manually by an expert) to be a correct representation of request 302 in an appropriate structured query language. For example, ground truth structured query 304 may be referred to as a gold standard structured query for request 302, and may be compared to an automatically generated structured query to determine an accuracy of the automatically generated structured query as described below in order to label nodes of the automatically generated structured query as correct or incorrect.

Request 302 may be provided as input to generative machine learning model 114. Generative machine learning model 114 may generate a generated structured query 306 based on the input request 302. Generated structured query 306 may, for example, be an automatically generated query in an appropriate structured query language based on request 302.

Generated structured query 306 may be provided to both node-level feature generation engine 220 and tree generation engine 210. Node-level feature generation engine 220 may generate node-level features 340 based on generated structured query 306 in a similar manner to that described above with respect to the generation of node-level features 222 based on AST 212 of FIG. 2. For example, node-level features 340 may be based on structural properties of each node in the generated structured query AST 320, relational properties of each node relative to a schema of the target database 180, and/or the like.

The tree generation engine 210 may process generated structured query 306 to produce a generated structured query abstract syntax tree (AST) 320. Ground truth structured query 304 may also be provided to tree generation engine 210, and tree generation engine 210 may process ground truth structured query 304 to produce a ground truth structured query AST 310. Generated structured query AST 320 and ground truth structured query AST 310 may be abstract syntax trees representing the structure of the respective queries. For example, tree generation engine 210 may process the input queries and generate the ASTs in a similar manner to that described above with respect to the generation of AST 212 based on structured query 202 of FIG. 2.

Generated structured query AST 320 and ground truth structured query AST 310 may be compared to one another in order to generate labels for the nodes of generated structured query AST 320 at node-level alignment and label generation 350. For example, at node-level alignment and label generation 350, a node alignment module may align nodes between the generated structured query AST 320 and ground truth structured query AST 310 to automatically generate node-level labels 352 for nodes in generated structured query AST 320. The node-level labels 352 may indicate whether each node in generated structured query AST 320 is correct or incorrect compared to nodes in ground truth structured query AST 310. The process of generating node-level labels 352 is described in more detail below with respect to FIG. 4.

For example, node-level alignment and label generation 350 may employ a recursive tree traversal algorithm to compare the structure and content of generated structured query AST 320 and ground truth structured query AST 310. This process may begin at the root nodes of both trees and proceed downwards, comparing corresponding nodes at each level. The alignment algorithm may consider various factors such as node types, attributes, and child structures to determine equivalence between nodes. In cases where direct matches are not found, the algorithm may attempt to find the best possible alignment by considering semantic similarities or structural patterns. Semantic similarity may be determined, for example, based on generating embeddings of node contents and comparing the embeddings to one another (e.g., using a similarity measure such as cosine similarity or Euclidean distance). Embeddings may, for example, be generated using an embedding model.

For example, two nodes may be considered semantically equivalent if the two nodes are identical or if they are a known operator pair (e.g., > versus <) that permits equivalence under operand swapping. If the two nodes are column expressions, the nodes may be considered semantically equivalent if their unqualified names match exactly, where qualifiers (e.g., aliases or table names) either match directly or resolve to the same base table via an alias-to-table map extracted from each AST. If the two nodes are literals, identifiers, or base tables, the nodes may be considered semantically equivalent if their content (e.g., string or numeric value) matches exactly. If the nodes are binary operators (e.g., =, >, and the like), the nodes may be considered semantically equivalent if both children of the nodes match in order or the operator is symmetric or anti-symmetric and the children of the nodes match in reverse order.

As nodes are compared, labels may be assigned to each node in generated structured query AST 320, indicating whether it matches a corresponding node in the ground truth structured query AST 310. Nodes that align closely with their counterparts in the ground truth AST may be labeled as correct, while those that differ (e.g., more than a threshold amount, according to more than a threshold number of criteria, in particular critical criteria, and/or the like) or have no clear correspondence may be labeled as incorrect. This labeling process may also take into account the context of each node within the larger query structure, potentially adjusting labels based on the correctness of parent or child nodes. The resulting node-level labels 352 may provide a detailed map of where, at the node level, the generated query aligns with or deviates from the ground truth query, serving as valuable training data for use in training machine learning model 118.

In an example, the generated structured query is "SELECT name FROM artists ORDER BY name" and the ground truth structured query is "SELECT name FROM artist WHERE name='A'" In this example, the labeler would output a label of incorrect due to a content error for the table name artists (e.g., as compared to artist), a label of incorrect due to a structural error for the additional ORDER BY clause and its child nodes, and no indication of an error for the missing WHERE clause, because omissions in the generated query are not penalized.

When a generated node is aligned with a ground truth node of the same type, its content (i.e., identifier, literal, or function name) may be required to match exactly for a label of correct to be applied. Otherwise, a content error may be determined. An examples of a content error in an identifier is artists vs. artist, an example of a content error in a literal is 1 vs. 2, and an example of a content error in a function is MAX( ) vs. SUM( ) Content errors include mismatches in base table names and literal constants. Aliases, however, may be explicitly excluded from content comparison in some cases, and may be normalized via the alias-to-table mapping.

Type errors occur when a generated node is aligned to a ground truth node, but their expression types differ in a way that changes query semantics. However, the label generation process may account for operator equivalence. For example, for symmetric Operators (e.g., =, =!), operand order may be disregarded such that a=b and b=a are treated as equivalent. For anti-symmetric operators (e.g., >, <, >=, <=), nodes may be considered equivalent if both operands are swapped and the operator is flipped. For example, a>b is equivalent to b<a. Other type mismatches may be labeled as errors.

If a node appears in the generated structured query but has no equivalent in the ground truth structured query, it may be considered a structural insertion and labeled as an error. Its descendants may also recursively be labeled as errors. For example, a LIMIT or ORDER BY clause that is present only in the generated structured query may be considered a structural error, as may be unexpected JOIN clauses or incorrectly nested subqueries. Conversely, if a clause or node appears in the ground truth structured query but is missing in the generated structured query, no error may be detected.

Column and table references may include explicit qualifiers such as table names or aliases (e.g., a.name vs. name). Such nodes may be treated as semantically equivalent when the column name is identical, and the qualifiers either match directly, or resolve to the same base table via alias mapping. Alias names themselves may not be required to match, and may not trigger content errors. A mapping from alias to base table may be computed for both ASTs and used to normalize qualified comparisons.

Post-processing may be performed to further refine the labels. For example, to reduce over-labeling, certain types of nodes such as SELECT, FROM, WHERE, GROUP BY, and comparison operators (=, =!) may not be blamed (e.g., may be relabeled from incorrect to correct) if only their children differ. Structural nodes like JOIN and LIMIT may be blamed (e.g., labeled as incorrect) if they are incorrect or inserted (e.g., not present in the ground truth structured query). A final pass may reclassify any node that matches an equivalent node elsewhere in the ground truth structured query AST to correct to account for greedy alignment mismatches. The first, contextual, pass may not be redundant because being contextually aware often leads to more "correct" labels.

The node-level features 340 and node-level labels 352 may be provided to a model training component for use in model training 360. The model training component may use these inputs to train the machine learning model 118, such as through a supervised learning process. The machine learning model 118 may be trained through model training 360, based on node-level features 340 and node-level labels 352, to predict node-level error probabilities in generated structured queries.

Supervised learning techniques generally involve providing training inputs (e.g., node features 340) to a machine learning model (e.g., machine learning model 118). The machine learning model processes the training inputs and outputs predictions (e.g., predictions of error probabilities for each node) based on the training inputs. The predictions are compared to known labels (e.g., node labels 352) associated with the training inputs to determine the accuracy of the machine learning model, and parameters of the machine learning model are iteratively adjusted until one or more conditions are met. For instance, the one or more conditions may relate to an objective function (e.g., a cost function or loss function) for optimizing one or more variables (e.g., model accuracy). In some embodiments, the conditions may relate to whether the predictions produced by the machine learning model based on the training inputs match the known labels associated with the training inputs or whether a measure of error between training iterations is not decreasing or not decreasing more than a threshold amount. The conditions may also include whether a training iteration limit has been reached. Model parameters adjusted during training may include, for example, hyperparameters, values related to numbers of iterations, weights, functions used by nodes to calculate scores, level of randomness, and/or the like. In some embodiments, validation and testing are also performed for a machine learning model, such as based on validation data and test data, as is known in the art. It is noted that "training" as used herein may refer to initial training, re-training, and/or fine tuning of a machine learning model, such as machine learning model 118, generative machine learning model 114, and/or other machine learning models described herein.

In some cases, the system may use the BIRD (BIg Bench for LaRge-scale Database Grounded Text-to-SQL Evaluation) minidev dataset, the SynSQL-2.5M dataset, and/or the like for training and/or evaluation of machine learning model 118 and/or generative machine learning model 114. These datasets are included as examples that may provide a diverse range of input requests, ground truth queries, and generated queries across various database schemas, allowing the model to learn from a wide variety of query structures and potential error patterns. However, any suitable dataset may be used for such a training process.

Generally, the training process for machine learning model 118 at model training 360 may involve iteratively adjusting parameters of machine learning model 118 to minimize the difference between its predicted error probabilities and the labels derived from the node alignment process. This supervised learning approach may enable machine learning model 118 to learn complex patterns and relationships within query structures, leading to more accurate and context-aware error prediction capabilities.

Once trained, machine learning model 118 may be used to predict node-level error probabilities for a generated structured query based on node-level features (e.g., determined from an AST representation of the generated structured query), as described herein. A node-level error probability may, for example, be a numerical value (e.g., between 0 and 1, between 0 and 100, and/or the like) indicating a likelihood that a given node is associated with an error.

Machine learning model 118 may be retrained over time as new training data becomes available, such as based on ground truth feedback received after using the trained machine learning model 118 to predict node-level error probabilities. For example, if an output from the trained machine learning model 118 indicates that a particular node is likely erroneous, but ground truth data (e.g., based on user input, results of attempting to execute a corresponding structured query, and/or the like) indicates that the particular node is not erroneous, this ground truth data may be used as a label for a new training data instance including node-level features of the underlying structured query, and the new training data instance may be used to retrain machine learning model 118 in a similar manner to that described above with respect to model training 360 The retrained machine learning model 118 may then be used to generate improved node-level error probabilities for subsequent generated structured queries.

Example Pseudocode Algorithm Related to Node Alignment and Labeling

FIG. 4 illustrates a flowchart showing a pseudocode algorithm 400 for labeling generated Abstract Syntax Tree (AST) nodes via alignment with a gold AST. The pseudocode algorithm 400 defines an example process for comparing and labeling nodes between a generated structured query AST (e.g., "generated AST") and a ground truth (or "gold standard") structured query AST (e.g., "gold AST"). For example, pseudocode algorithm 400 may be an example implementation of aspects of node-level alignment and label generation 350 of FIG. 3.

The pseudocode algorithm 400 takes as input a generated AST (Tgen) and a gold AST (Tgold), and outputs a label map L that assigns 0 (correct) or 1 (error) to each node in Tgen. The algorithm begins by initializing L, labeling all nodes in Tgen as 1 (error). This initial labeling assumes all nodes are incorrect until proven otherwise through the alignment process.

Next, the pseudocode algorithm 400 builds alias maps from both ASTs to normalize qualifiers. This step may address cases where different aliases may be used for the same table or column in the generated and gold queries, ensuring that semantically equivalent nodes are not mistakenly labeled as incorrect due to superficial differences in naming.

The core of the pseudocode algorithm 400 may be the AlignAndLabel function, which recursively compares subtrees rooted at nodes in the ASTs to determine semantic equivalence. This function takes nodes ngen and ngold as parameters, representing corresponding nodes from the generated and gold ASTs, respectively. For example, the Alight-AndLabel function may be performed for each pair of corresponding nodes ngen and ngold from Tgen and Tgold.

Within the AlignAndLabel function, the algorithm first checks if ngen and ngold are recursively equivalent using the AreRecursivelyEquivalent function. This function may compare various aspects of the nodes to determine equivalence, including node types, unqualified names for column expressions, content for literals, identifiers, and/or base tables, children for binary operators, semantic equivalence, and/or the like. Binary operators may be determined to be semantically equivalent if one of the following two conditions it true: (1) if the children of the binary operators match in order; or (2) if the binary operators are symmetric or antisymmetric and their children match in reverse order. This approach to determining semantic equivalence for binary operators may allow for accurate comparison of nodes even when the order of operands differs, accommodating cases where the generated query and ground truth query express equivalent operations in slightly different syntactic structures. In the context of structured query languages and abstract syntax trees, an example of a symmetric binary operator is an equality operator (=): The expression "A=B" is semantically equivalent to "B=A". For example, in a WHERE clause, "WHERE column1=column2" has the same meaning as "WHERE column2=column1". Another example of a symmetric binary operator is a UNION operator: In set operations, "SELECT FROM table1 UNION SELECT FROM table2" produces the same result set as "SELECT FROM table2 UNION SELECT FROM table1".

An example of an antisymmetric binary operators is a less than operator (<): The expression "A<B" is not equivalent to "B<A". For instance, in a WHERE clause, "WHERE column1<column2" has a different meaning than "WHERE column2<column1". An example of an antisymmetric binary operator is a LEFT JOIN operator: In join operations, "SELECT FROM table1 LEFT JOIN table2 ON table1.id=table2.id" may produce a different result set than "SELECT FROM table2 LEFT JOIN table1 ON table2.id=table1.id", as the order of tables in a LEFT JOIN affects which table's rows are fully preserved in the result.

If ngen and ngold are determined to be recursively equivalent, all nodes in the subtree rooted at ngen are marked as correct (0) in the label map L, and the AlignAndLabel function returns (e.g., and may then be executed again for a next pair of node ngen and ngold). The step of labeling all nodes in the subtree rooted at ngen as correct (0) in the label map L efficiently labels entire subtrees as correct when a match is found at a higher level.

If ngen and ngold are not equivalent, the algorithm marks ngen as an error (1) in L and proceeds to compare the children of ngen and ngold in the respective trees. For each child cgen of ngen, the algorithm attempts to find a matching child cgold among the unmatched children of ngold. If a match is found, the AlignAndLabel function is called recursively on cgen and cgold (e.g., with cgen and cgold being provided to the AlignAndLabel function as ngen and ngold), and cgold is marked as matched to prevent it from being considered for future alignments.

After the recursive alignment process, the pseudocode algorithm 400 performs two post-processing steps to refine the labeling. First, the algorithm suppresses blame for structural nodes if only their children are labeled as errors. For example, suppressing blame for such a node may involve changing a label for the node from incorrect (1) to correct (0), such as if the node was previously labeled as incorrect only on account of one or more of the node's children (and not separately based on the node itself). This step may prevent over-penalization of higher-level nodes when the errors are localized in their children. Secondly, a final pass may be performed to relabel as correct any node that was previously labeled as incorrect and that matches an equivalent node in the gold AST under the AreRecursivelyEquivalent function. This step may capture correct nodes that were misaligned due to structural differences between the generated and gold ASTs.

These post-processing steps may help to produce more accurate and nuanced labeling, accounting for cases where the generated query may be semantically correct despite structural differences from the gold standard.

The pseudocode algorithm 400 concludes by returning the completed label map L (e.g., which may correspond to node-level labels 352 of FIG. 3), which contains the final correct/incorrect labels for each node in the generated AST. These labels may then be used as training data for the machine learning model 118 (e.g., at model training 360 of FIG. 3), enabling it to learn patterns of correct and incorrect query structures at a fine-grained, node level.

In some aspects, the system may employ various techniques to enhance the robustness and accuracy of the node-level uncertainty estimation process. For example, the system may utilize ensemble methods, combining predictions from multiple machine learning models to generate more reliable error probabilities. This approach may involve training several models with different architectures or on different subsets of the training data, and then aggregating their predictions using techniques such as weighted averaging or majority voting.

The system may also incorporate active learning strategies to improve the efficiency of the training process. In this approach, the system may identify the most informative or uncertain examples from a pool of unlabeled data and prioritize those examples for labeling and inclusion in the training set. This may help to focus the learning process on the most challenging cases, potentially leading to faster convergence and better overall performance. In some cases, examples that exhibit complex query structures, rare database schema elements, or ambiguous natural language requests may be considered more informative for training, as they may provide valuable insights into edge cases and challenging scenarios that the model might encounter in real-world applications.

In some implementations, the system may employ transfer learning techniques to leverage knowledge gained from training on one database schema or query type to improve performance on related but distinct tasks. This may involve pre-training the machine learning model on a large, diverse dataset of structured queries and then fine-tuning it for specific database environments or query patterns.

The system may also incorporate attention mechanisms into the machine learning model architecture. These mechanisms may allow the model to focus on the most relevant parts of the input when making predictions, potentially improving its ability to capture long-range dependencies and complex relationships within the query structure.

In some cases, the system may employ explainable AI techniques to provide insights into the model's decision-making process. This may involve generating feature importance scores or attention maps that highlight which aspects of a node or its context most strongly influence the predicted error probability. Such explanations may be valuable for debugging, improving trust in the system, and guiding efforts to refine the query generation process.

The system may also adapt its uncertainty estimation approach based on the specific characteristics of the target database schema and typical query patterns. For example, it may adjust feature generation or model architecture to better capture domain-specific nuances in query structure or semantics.

In some implementations, the system may incorporate feedback loops that allow it to continuously improve its performance over time. This may involve tracking the accuracy of its predictions in real-world usage scenarios and using this information to periodically update the model or adjust its decision thresholds.

The system may also employ techniques to handle imbalanced datasets, where correct nodes may significantly outnumber incorrect nodes in training data. This may involve strategies such as oversampling minority classes, undersampling majority classes, or using synthetic data generation techniques like SMOTE (Synthetic Minority Over-sampling Technique) to create a more balanced training set.

In some aspects, the system may utilize curriculum learning approaches, where the model is initially trained on simpler, more straightforward queries and gradually exposed to more complex and challenging examples. This strategy may help the model to build a strong foundation of basic query understanding before tackling more intricate structures and edge cases.

Figure 5:
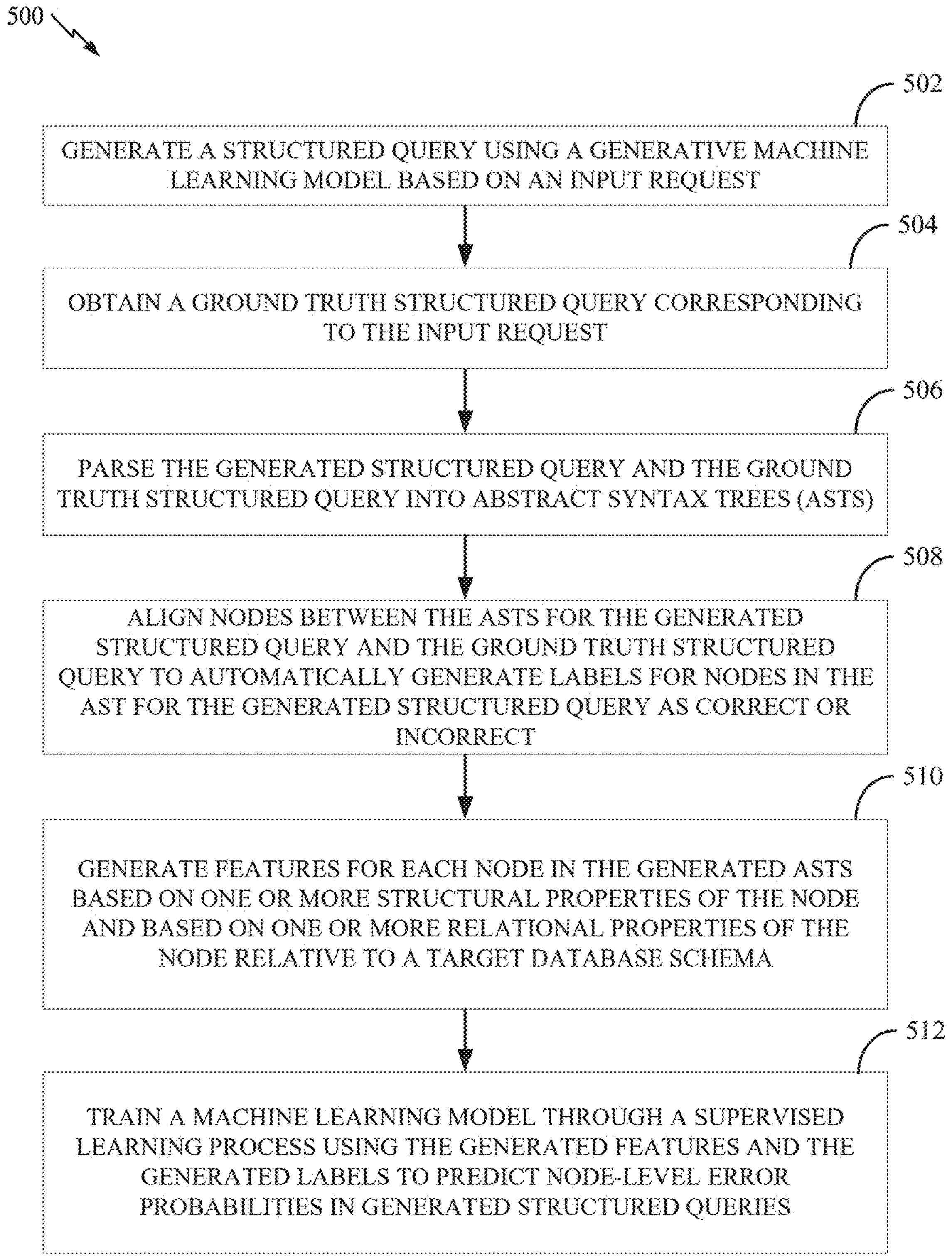
FIG. 5 illustrates a flowchart of operations for training a node-level uncertainty estimation machine learning model, according to aspects of the present disclosure.

Example Operations Related to Node-Level Uncertainty Estimation for Machine Learning Model Generated Structured Queries FIG. 5 illustrates a flowchart of operations 500 for training a node-level uncertainty estimation machine learning model. For example, operations 500 may be performed by one or more components described herein, such as model trainer 757 of FIG. 7B, described below.

Operations 500 may begin at a step 502, with generating a structured query using a generative machine learning model based on an input request. For example, the input request may be similar to request 124 of FIG. 4.

Operations 500 may then proceed to step 504, with obtaining a ground truth structured query corresponding to the input request. The ground truth structured query, such as ground truth structured query 304 of FIG. 3, may represent a verified correct representation of the input request in an appropriate structured query language.

Operations 500 may then proceed to step 506, with parsing the generated structured query and the ground truth structured query into abstract syntax trees (ASTs). For example, tree generation engine 210 of FIG. 2 and/or FIG. 3 may perform this parsing process to create hierarchical representations of the queries' syntactic structures, such as ground truth structured query AST 310 and generated structured query AST 320 of FIG. 3.

Operations 500 may then proceed to step 508, with aligning nodes between the ASTs for the generated structured query and the ground truth structured query to automatically generate labels for nodes in the AST for the generated structured query as correct or incorrect. The labels may, for example, be node-level labels 352 of FIG. 3.

In some aspects, the aligning of nodes between the ASTs for the generated structured query and the ground truth query may involve recursively comparing subtrees rooted at nodes in the ASTs to determine semantic equivalence. Nodes in the AST for the generated structured query may be labeled as correct if semantically equivalent nodes are found for the nodes in the AST for the ground truth structured query based on the recursive comparison.

The determination of semantic equivalence may include comparing node types, comparing unqualified names for column expressions, comparing content for literals, identifiers, or base tables, and comparing children for binary operators. In some cases, binary operators may be determined to be semantically equivalent if their children match in order, or if the binary operators are symmetric or anti-symmetric and their children match in reverse order.

The automatic generation of labels for nodes in the AST for the generated structured query may include refinement steps. For example, if a structural node is labeled as incorrect only as a result of one or more children of the structural node being labeled as incorrect, the structural node may be relabeled as correct. Additionally, a final pass may be performed to relabel as correct any node that was previously labeled as incorrect and that matches an equivalent node in the AST for the ground truth structured query.

Operations 500 may then proceed to step 510, with generating features for each node in the generated ASTs. These features may be generated based on structural properties of the node and relational properties of the node relative to a target database schema. In some cases, a node-level feature generation engine 220 may generate a given number of features for each node, such as producing node-level features 340 of FIG. 3.

The generated features may include base structural features describing the node's identity and position within the AST. For example, these features may capture information such as the node's depth in the tree, its relationship to parent and child nodes, and its role within specific query clauses.

Schema consistency features may be generated based on comparing the node's content to the target database schema. These may include an identifier validity feature based on checking if a table or column name exists in the target database schema. A qualifier scope validity feature may be used based on checking if a qualifier is valid within the current query scope. Additionally, a column ambiguity feature may be employed based on detecting if an unqualified column name corresponds to columns in multiple tables.

Lexical features may be generated for the node. These may include a Levenshtein distance feature based on computing an edit distance to the closest valid identifier in the target database schema. A name pattern feature may be used to capture lexical patterns in identifiers.

Contextual or heuristic features capturing common structured query error patterns may also be generated. These may include an aggregate context feature based on detecting the presence of a non-aggregated column in a SELECT list with an aggregate function without a GROUP BY clause. A data type compatibility feature may be used for binary operations. Operator-specific features may be generated for particular node types.

During the feature generation process, nodes of different types may require different sets of features. In such cases, features not applicable to a particular node type may be assigned a neutral default value, ensuring a consistent feature vector size across all nodes while preserving the relevance of the generated features.

Operations 500 may then proceed to step 512, with training a machine learning model (e.g., machine learning model 118) through a supervised learning process using the generated features and the generated labels. The training may result in the machine learning model being configured to predict node-level error probabilities in generated structured queries. The training process may involve iteratively adjusting parameters of the machine learning model to minimize the difference between its predicted error probabilities and the labels derived from the node alignment process.

In some implementations, the training of the machine learning model may involve training a gradient boosted decision tree model. The generated node-level features for each node may be provided as inputs to this model, which may then output probabilities of error for the respective nodes.

Figure 6:
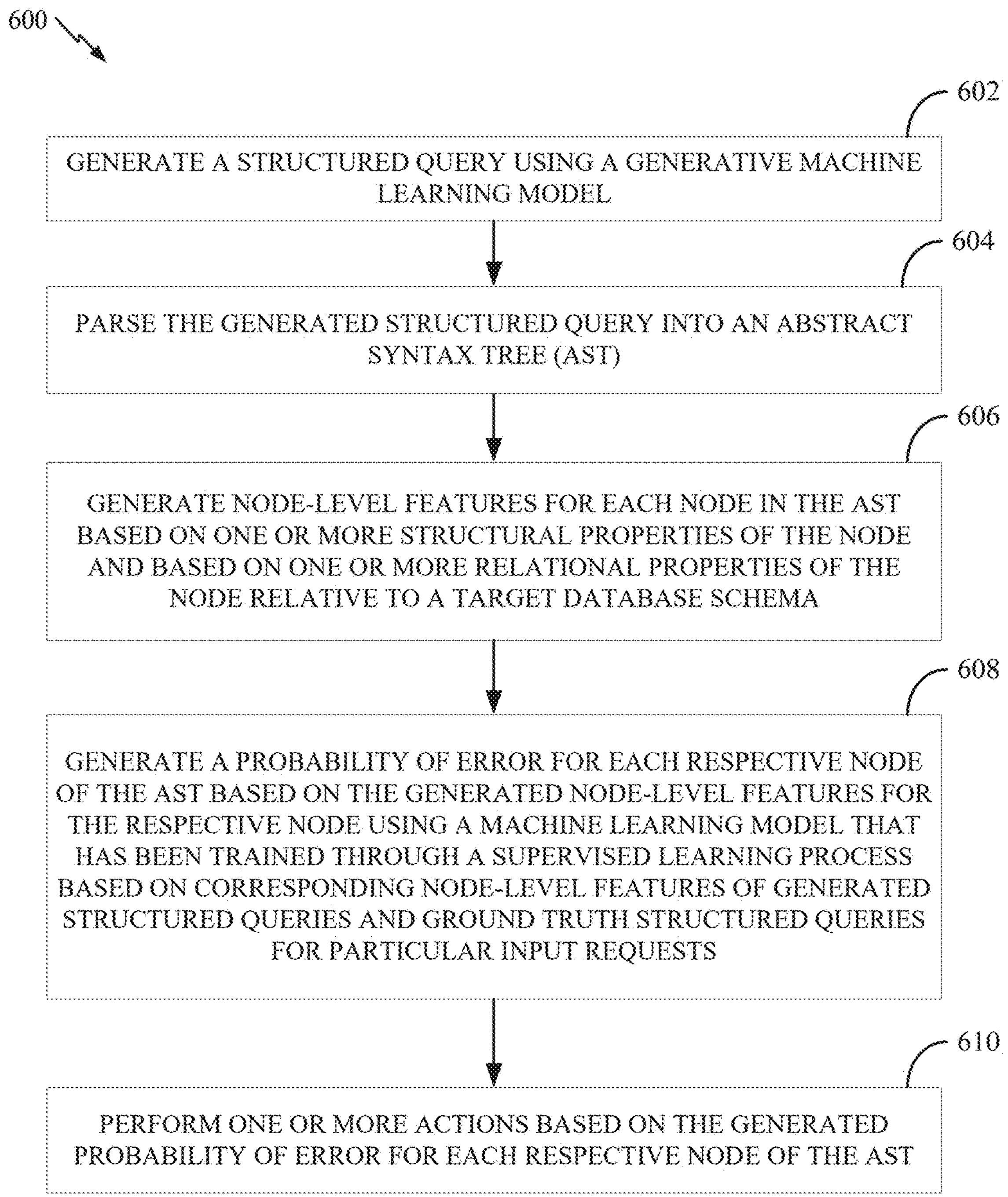
FIG. 6 illustrates a flowchart of operations for estimating uncertainty in generated structured queries, according to aspects of the present disclosure.

FIG. 6 illustrates a flowchart of operations 600 for estimating uncertainty in generated structured queries. For example, operations 600 may be performed by one or more components described herein, such as structured query evaluation engine 116 and/or structured query execution engine 119 of FIG. 1.

Operations 600 may begin at a step 602, with generating a structured query using a generative machine learning model. For example, the structured query generation engine 112 may use the generative machine learning model 114 to generate the structured query based on a request 124 received from a client 120.

Operations 600 may then proceed to step 604, with parsing the generated structured query into an abstract syntax tree (AST). For example, the tree generation engine 210 may process the generated structured query to produce an abstract syntax tree 212 representing the hierarchical structure of the query.

Operations 600 may then proceed to step 606, with generating node-level features for each node in the AST. These features may be based on structural properties of the node and based on relational properties of the node relative to a target database schema. For example, node-level feature generation engine 220 may generate node-level features 222 for each node in abstract syntax tree 212.

The node-level features may include base structural features describing the node's identity and position within the AST. In some cases, these base structural features may include the syntactic type of the node, the depth of the node relative to a root of the AST, and/or the type of an immediate parent node of the node.

The node-level features may also include schema consistency features based on comparing the node's content to the target database schema. In some cases, these schema consistency features may include an identifier validity feature based on checking if a table or column name exists in the target database schema. A qualifier scope validity feature may be based on checking if a qualifier is a valid table or alias within a current query scope. Additionally, a column ambiguity feature may be based on detecting if an unqualified column name corresponds to columns in multiple tables.

The node-level features may further include lexical features for the node. In some cases, these lexical features may include a Levenshtein distance feature based on computing an edit distance to a closest valid identifier in the target database schema. A name pattern feature may capture a lexical pattern in an identifier.

The node-level features may also include contextual or heuristic features capturing common structural query error patterns. In some cases, these may include an aggregate context feature based on detecting presence of a non-aggregated column in a SELECT list containing an aggregate function without a corresponding GROUP BY clause. A data type compatibility feature may be generated for a binary operation. An operator-specific feature may be generated for a particular node type.

In some cases, the node-level feature generation engine 220 may assign a neutral default value to features not applicable to a node type of the node.

Operations 600 may then proceed to step 608, with generating a probability of error for each respective node of the AST. This probability may be based on the generated node-level features for the respective node using a machine learning model. The machine learning model may have been trained through a supervised learning process based on corresponding node-level features of generated structured queries and ground truth structured queries for particular input requests.

In some cases, the machine learning model for predicting node-level error probabilities may be a gradient boosted decision tree model. The generated node-level features for each node may be provided as inputs to this model, which may then output probabilities of error for the respective nodes.

Operations 600 may then proceed to step 610, with performing one or more actions based on the generated probability of error for each respective node of the AST. For example, the generated probabilities may be used to determine whether to execute the structured query, modify the structured query, or request generation of a new structured query. In some cases, if the probability of error for a node exceeds a threshold, the structured query execution engine 119 may determine not to execute the structured query and may instead request a new or modified query from the structured query generation engine 112. In some aspects, if the probability of error for each node does not exceed a threshold, the structured query execution engine 119 may execute the structured query against a target database, and a result of executing the structured query may be returned (e.g., and a response based on the result may be displayed via a user interface and/or otherwise provided to one or more components).

Example Processing Systems

Figure 7A:
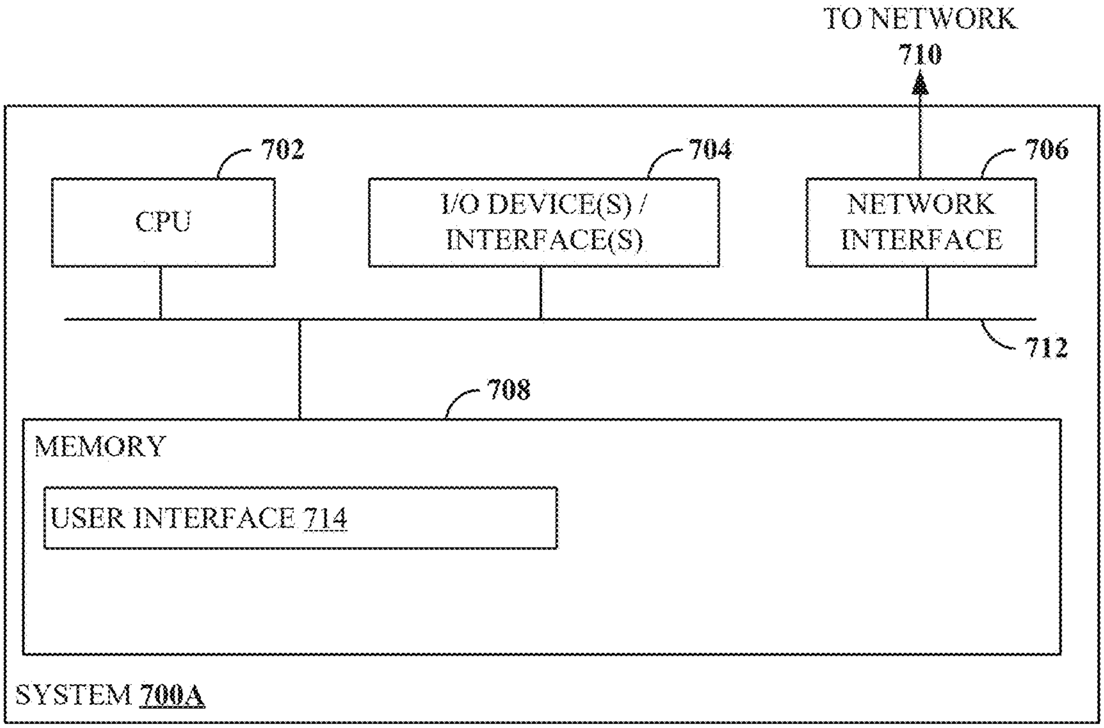
FIG. 7A and FIG. 7B illustrate block diagrams of two computing systems related to node-level uncertainty estimation for machine learning model generated structured queries, according to aspects of the present disclosure.

FIG. 7A illustrates an example system 700A with which embodiments of the present disclosure may be implemented. For example, system 700A may be configured to perform aspects of one or more of operations 500 of FIG. 5 and/or operations 600 of FIG. 6. In one example system 700A corresponds to client 120 of FIG. 1.

System 700A includes a central processing unit (CPU) 702, one or more I/O device interfaces 704 that may allow for the connection of various I/O devices (e.g., keyboards, displays, mouse devices, pen input, etc.) to the system 700A, network interface 706, a memory 708, and an interconnect 712. It is contemplated that one or more components of system 700A may be located remotely and accessed via a network 710. It is further contemplated that one or more components of system 700A may comprise physical components or virtualized components.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, and memory 708. CPU 702 is included to be representative of a single CPU, multiple CPUs, a single CPU having multiple processing cores, and other arrangements.

Additionally, the memory 708 is included to be representative of a random access memory or the like. In some embodiments, memory 708 may comprise a disk drive, solid state drive, or a collection of storage devices distributed across multiple storage systems. Although shown as a single unit, the memory 708 may be a combination of fixed and/or removable storage devices, such as fixed disc drives, removable memory cards or optical storage, network attached storage (NAS), or a storage area-network (SAN).

As shown, memory 708 includes a user interface 714, which may be representative of user interface 122 of FIG. 1. For example, a user may interact with user interface 714 to request information, review and/or provide feedback with respect to automatically generated responses, review, configure, and/or provide feedback with respect to structured query generation and/or evaluation, and/or the like.

Figure 7B:
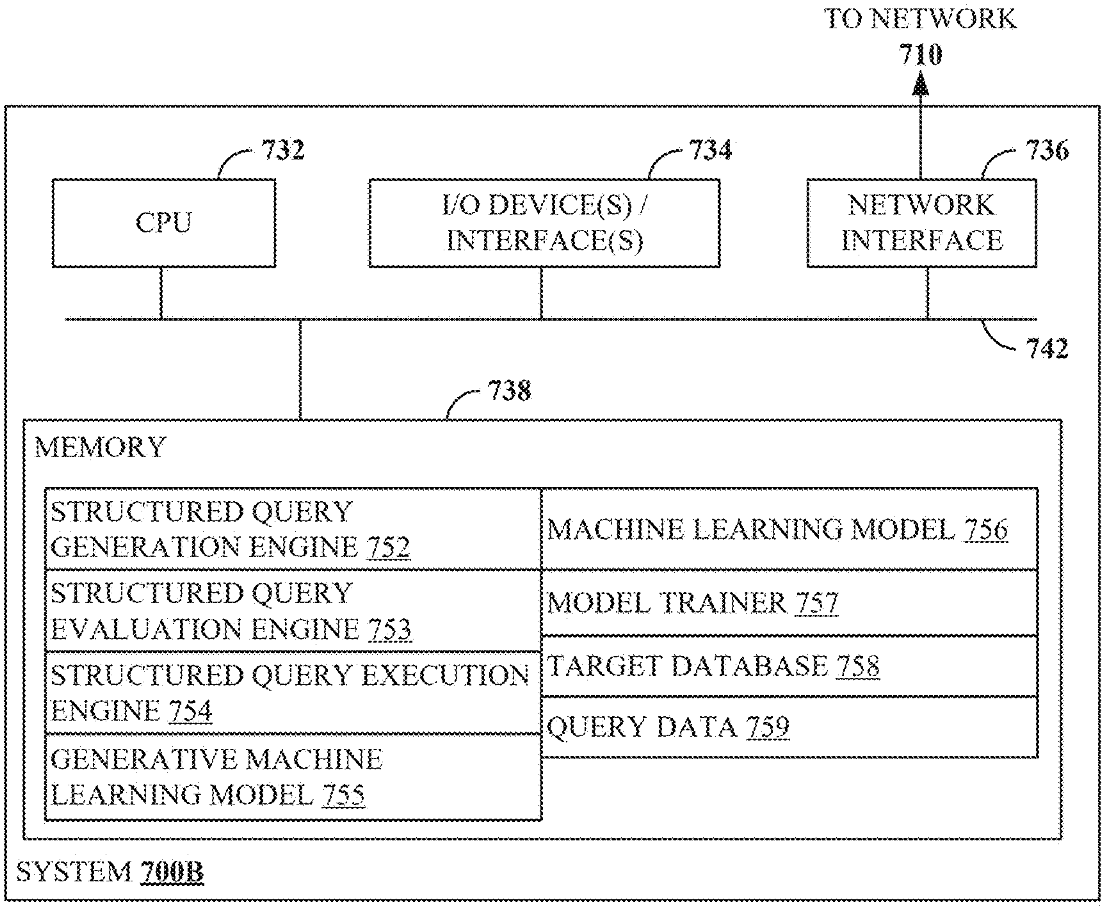

FIG. 7B illustrates another example system 700B with which embodiments of the present disclosure may be implemented. For example, system 700B may correspond to server 110 of FIG. 1, and may be configured to perform aspects of one or more of operations 500 of FIG. 5 and/or operations 600 of FIG. 6.

System 700B includes a CPU 732, one or more I/O device interfaces 734 that may allow for the connection of various I/O devices (e.g., keyboards, displays, mouse devices, pen input, etc.) to the system 700B, network interface 736, a memory 738, and an interconnect 742. It is contemplated that one or more components of system 700B may be located remotely and accessed via a network 710. It is further contemplated that one or more components of system 700B may comprise physical components or virtualized components.

CPU 732 may retrieve and execute programming instructions stored in the memory 738. Similarly, the CPU 732 may retrieve and store application data residing in the memory 738. The interconnect 742 transmits programming instructions and application data, among the CPU 732, I/O device interface 734, network interface 736, and memory 738. CPU 732 is included to be representative of a single CPU, multiple CPUs, a single CPU having multiple processing cores, and other arrangements.

Additionally, the memory 738 is included to be representative of a random access memory or the like. In some embodiments, memory 738 may comprise a disk drive, solid state drive, or a collection of storage devices distributed across multiple storage systems. Although shown as a single unit, the memory 738 may be a combination of fixed and/or removable storage devices, such as fixed disc drives, removable memory cards or optical storage, network attached storage (NAS), or a storage area-network (SAN).

As shown, memory 738 includes structured query generation engine 752, structured query evaluation engine 753, structured query execution engine 754, generative machine learning model 755, machine learning model 756, and target database 758, which may be representative of structured query generation engine 112, structured query evaluation engine 116, structured query execution engine 119, generative machine learning model 114, machine learning model 118, and target database 180 of FIG. 1.

Memory 738 further includes model trainer 757, which may perform operations related to training machine learning model 756 and/or generative machine learning model 755, such as model training 360 of FIG. 3. Memory 738 further includes query data 759, which may include one or more structured queries and/or related data (e.g., ASTs, features, error probabilities, requests, responses, and/or the like).

It is noted that systems 700A and 700B are included as examples, and certain functionality described with respect to systems 700A and/or 700B and/or otherwise described herein may be implemented via more or fewer devices and/or components.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for training a node-level uncertainty estimation for machine learning model for structured queries, comprising:

generating a structured query for a target database using a generative machine learning model based on an input request and based on a schema of the target database;

obtaining a ground truth structured query corresponding to the input request;

parsing the generated structured query and the ground truth query into abstract syntax trees (ASTs);

aligning nodes between the ASTs for the generated structured query and the ground truth query to automatically generate labels for nodes in the AST for the generated structured query as correct or incorrect;

generating features for each node in the ASTs based on one or more structural properties of the node and based on one or more relational properties of the node relative to the schema of the target database, wherein at least one of the one or more relational properties is generated based on a comparison involving the node and one or more elements in the schema of the target database and indicates whether the node is aligned with a structure of the target database; and training a machine learning model through a supervised learning process using the generated features and the generated labels to predict node-level error probabilities in generated structured queries.

2. The method of claim 1, wherein the aligning of the nodes between the ASTs for the generated structured query and the ground truth query comprises:

recursively comparing subtrees rooted at nodes in the ASTs for the generated structured query and the ground truth query to determine semantic equivalence; and labeling nodes in the AST for the generated structured query as correct if semantically equivalent nodes are found for the nodes in the AST for the ground truth structured query based on the recursively comparing.

3. The method of claim 2, wherein the determining of the semantic equivalence comprises one or more of:

comparing node types;

comparing unqualified names for column expressions;

comparing content for literals, identifiers, or base tables; or comparing children for binary operators.

4. The method of claim 3, wherein the determining of the semantic equivalence comprises the comparing of the children for the binary operators, and wherein the determining of the semantic equivalence further comprises:

determining that the binary operators are semantically equivalent if the children of the binary operators match in order; or determining that the binary operators are semantically equivalent if the binary operators are symmetric or antisymmetric and the children of the binary operators match in reverse order.

5. The method of claim 1, wherein the automatically generating of the labels for the nodes in the AST for the generated structured query as correct or incorrect comprises, if a structural node is labeled as incorrect only as a result of one or more children of the structural node being labeled as incorrect, relabeling the structural node as correct.

6. The method of claim 5, wherein the automatically generating of the labels for the nodes in the AST for the generated structured query as correct or incorrect further comprises performing a final pass to relabel as correct any node that was previously labeled as incorrect and that matches an equivalent node in the AST for the ground truth structured query.

7. The method of claim 1, wherein the generating of the features for each node comprises one or more of:

generating one or more base structural features describing the node's identity and position within a corresponding AST of the ASTs;

generating one or more schema consistency features based on comparing the node's content to the schema of the target database;

generating one or more lexical features for the node; or generating one or more contextual or heuristic features capturing one or more common structured query error patterns.

8. The method of claim 7, wherein the one or more schema consistency features include one or more of:

an identifier validity feature that is based on checking if a table or column name exists in the schema of the target database;

a qualifier scope validity feature that is based on checking if a qualifier is a valid table or alias within a current query scope; or a column ambiguity feature that is based on detecting if an unqualified column name corresponds to columns in multiple tables.

9. The method of claim 7, wherein the one or more lexical features include one or more of:

a Levenshtein distance feature that is based on computing an edit distance to a closest valid identifier in the schema of the target database; or a name pattern feature capturing a lexical pattern in an identifier.

10. The method of claim 7, wherein the one or more contextual or heuristic features include one or more of:

an aggregate context feature that is based on detecting presence of a non-aggregated column in a SELECT list containing an aggregate function without a corresponding GROUP BY clause;

a data type compatibility feature for a binary operation; or an operator-specific feature for a particular node type.

11. The method of claim 1, wherein the using of the machine learning model comprises providing the generated node-level features for the respective node as inputs to a gradient boosted decision tree model and receiving the probability of error for the respective node as an output from the gradient boosted tree in response to the inputs.

12. The method of claim 1, wherein the generating of the node-level features for each node in the AST further comprises assigning a neutral default value to one or more features not applicable to a node type of the node.

13. A method for estimating uncertainty for machine learning model generated structured queries, comprising:

generating a structured query for a target database using a generative machine learning model based on an input request and based on a schema of the target database;

parsing the generated structured query into an abstract syntax tree (AST);

generating node-level features for each node in the AST based on one or more structural properties of the node and based on one or more relational properties of the node relative to the schema of the target database, wherein at least one of the one or more relational properties is generated based on a comparison involving the node and one or more elements in the schema of the target database and indicates whether the node is aligned with a structure of the target database;

generating a probability of error for each respective node of the AST based on the generated node-level features for the respective node using a machine learning model that has been trained through a supervised learning process based on corresponding node-level features of generated structured queries and ground truth structured queries for particular input requests; and performing one or more actions based on the generated probability of error for each respective node of the AST.

14. The method of claim 13, wherein the generating of the node-level features for each node in the AST comprises:

generating one or more base structural features describing the node's identity and position within the AST;

generating one or more schema consistency features based on comparing the node's content to the schema of the target database; or generating one or more lexical features for the node.

15. The method of claim 14, wherein the one or more base structural features include one or more of:

a syntactic type of the node;

a depth of the node relative to a root of the AST; or a type of an immediate parent node of the node.

16. The method of claim 14, wherein the one or more schema consistency features include one or more of:

an identifier validity feature that is based on checking if a table or column name exists in the schema of the target database;

a qualifier scope validity feature that is based on checking if a qualifier is a valid table or alias within a current query scope; or a column ambiguity feature that is based on detecting if an unqualified column name corresponds to columns in multiple tables.

17. The method of claim 14, wherein the one or more lexical features include one or more of:

a Levenshtein distance feature that is based on computing an edit distance to a closest valid identifier in the schema of the target database; or a name pattern feature capturing a lexical pattern in an identifier.

18. The method of claim 13, wherein the generating of the node-level features for each node in the AST further comprises generating one or more contextual or heuristic features capturing one or more common structural query error patterns.

19. The method of claim 18, wherein the one or more contextual or heuristic features include one or more of:

an aggregate context feature that is based on detecting presence of a non-aggregated column in a SELECT list containing an aggregate function without a corresponding GROUP BY clause;

a data type compatibility feature for a binary operation; or an operator-specific feature for a particular node type.

20. A system for estimating uncertainty for machine learning model generated structured queries, comprising:

one or more processors; and a memory storing instructions that, when executed by the one or more processors, cause the system to:

generate a structured query for a target database using a generative machine learning model based on an input request and based on a schema of the target database;

obtain a ground truth structured query corresponding to the input request;

parse the generated structured query and the ground truth query into abstract syntax trees (ASTs);

align nodes between the ASTs for the generated structured query and the ground truth query to automatically generate labels for nodes in the AST for the generated structured query as correct or incorrect;

generate features for each node in the ASTs based on one or more structural properties of the node and based on one or more relational properties of the node relative to the schema of the target database, wherein at least one of the one or more relational properties is generated based on a comparison involving the node and one or more elements in the schema of the target database and indicates whether the node is aligned with a structure of the target database; and train a machine learning model through a supervised learning process using the generated features and the generated labels to predict node-level error probabilities in generated structured queries.

* * * * *